US 9,158,735 B1

(12) United States Patent
Goudreau et al.

(10) Patent No.: US 9,158,735 B1
(45) Date of Patent: Oct. 13, 2015

(54) TECHNIQUES FOR GENERATING UNIQUE IDENTIFIERS (71) Applicant: EMC Corporation, Hopkinton, MA (US)

(72) Inventors: Robert F. Goudreau, Cary, NC (US); James M. Holt, Raleigh, NC (US); Karl M. Owen, Chapel Hill, NC (US); Alan L. Taylor, Cary, NC (US); Chung-Huy Chen, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 288 days.

(21) Appl. No.: 13/923,442

(22) Filed: Jun. 21, 2013

(51) Int. Cl.
*G06F 15/177* (2006.01)

(52) U.S. Cl.
CPC .................... *G06F 15/177* (2013.01)

(58) Field of Classification Search
CPC ... G06F 9/44502; G06F 9/44508; G06F 1/24; G06F 9/44526; G06F 15/177; G06F 9/44514; G06F 9/44523; G06F 11/1417; G06F 9/44505
USPC ....................................................... 713/1, 2
See application file for complete search history.

(56) References Cited

U.S. PATENT DOCUMENTS

| | | | |
|---|---|---|---|
| 6,594,756 B1* | 7/2003 | Moran et al. | 713/2 |
| 7,370,190 B2* | 5/2008 | Calhoon et al. | 713/2 |
| 8,127,122 B2* | 2/2012 | Barry et al. | 713/1 |
| 8,874,915 B1* | 10/2014 | Rodoper et al. | 713/171 |
| 2010/0325429 A1* | 12/2010 | Saha et al. | 713/158 |

OTHER PUBLICATIONS

Microsoft, "Offloaded data transfers," Windows, http://microsoft.com/en-us/library/windows/desktop/hh848056%28v=vs.85%29.avx, 2 Pages, Nov. 28, 2012.
Microsoft, "POPULATE_TOKEN_HEADER structure," Windows Drivers, http://msdn.microsoft.com/en-us/library/windows/hardware/hh967730%28v=vs.85%29.aspx, 2 Pages, May 17, 2013.
Microsoft, "WRITE_USING_TOKEN_HEADER structure," Windows Drivers, http://msdn.microsoft.com/en-us/library/windows/hardware/hh967746%28v=vs.85%29.aspx, 2 Pages, May 17, 2013.

* cited by examiner

*Primary Examiner* — Zahid Choudhury
(74) *Attorney, Agent, or Firm* — Muirhead and Saturnelli, LLC (57) ABSTRACT

Techniques are described for generating a unique identifier by a first processor using a plurality of values including a shared value, the first processor's identifier, a container identifier and a time value. The shared value is a common value used by a plurality of processors including the first processor. The container identifier identifies a memory location. The time value denotes an amount of time that has elapsed since the first processor was last booted.

20 Claims, 7 Drawing Sheets

TECHNIQUES FOR GENERATING UNIQUE IDENTIFIERS

BACKGROUND

1. Technical Field

This application generally relates to generation of unique identifiers.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

In connection with data storage system, and more generally any suitable system such as a computer system, it may be desirable to utilize techniques for generating unique identifiers for any one of a variety of different purposes.

SUMMARY OF THE INVENTION

In accordance with one aspect of the invention is a method for generating a unique identifier comprising: receiving a shared value, said shared value being a common value used by a plurality of processors; receiving a processor identifier of a first of the plurality of processors; receiving a container identifier identifying a memory location; receiving a time value denoting an amount of time that has elapsed since the first processor was last booted; and performing first processing by the first processor to determine the unique identifier using a plurality of values including the shared value, the processor identifier, the container identifier and the time value. The shared value may be a randomly selected integer. The shared value may be incremented each time any one of the plurality of processors is booted thereby producing a revised shared value each time any one of the plurality of processors is booted. The shared value may be stored in a memory of the first processor and may be incremented by the first processor to produce the revised shared value responsive to booting a second of the plurality of processors. The first processor may communicate the revised shared value to the second processor. The container identifier may identify a memory location of a structure and the method includes storing the unique identifier as a field in the structure. The time value may represent an absolute amount of time. The first processing may include concatenating the plurality of values. The processor identifier may be a world wide name uniquely identifying the first processor. A token driver may receive a request to generate a token where the token is a structure including the unique identifier as a field in the structure. The token driver may be code that is executed by the first processor of a data storage system. The container identifier may be a first index value identifying an element in an array. The array may be an array of tokens and each element of the array may be a token structure representing a different token. The first index value may identify a first token structure including the unique identifier.

In accordance with another aspect of the invention is a system comprising: a host and a data storage system comprising a plurality of main processors, and wherein the host includes a first memory comprising code stored therein for: sending a first request to the data storage system to generate a first token representing a first entity; and receiving the first token from the data storage system; and wherein the data storage system includes a second memory comprising code stored therein for: receiving the first request from the host; and performing first processing by a first of the plurality of processors to generate the first token, said first processing including: obtaining a shared value, said shared value being a common value used by the plurality of main processors; obtaining a processor identifier of the first processor; obtaining a container identifier identifying a memory location; obtaining a time value denoting an amount of time that has elapsed since the first processor was last booted; generating a unique identifier using a plurality of values including the shared value, the processor identifier, the container identifier and the time value; and generating the first token using the unique identifier. The unique identifier may be represented as a number of bits included as a portion of the first token. The shared value may be randomly selected integer. The shared value may be incremented each time any one of the plurality of processors is booted thereby producing a revised shared value each time any one of the plurality of processors is booted. The shared value may be stored in a memory used by the first processor and may be incremented by the first processor to produce the revised shared value responsive to booting a second of the plurality of processors. The first processor may communicate the revised shared value to the second processor.

In accordance with another aspect of the invention is a computer readable medium comprising code stored thereon generating a unique identifier the computer readable medium comprising code for: receiving a shared value, said shared value being a common value used by a plurality of processors; receiving a processor identifier of a first of the plurality of processors; receiving a container identifier identifying a memory location; receiving a time value denoting an amount of time that has elapsed since the first processor was last booted; and performing first processing by the first processor to determine the unique identifier using a plurality of values including the shared value, the processor identifier, the container identifier and the time value. The shared value may be incremented each time any one of the plurality of processors is booted thereby producing a revised shared value each time any one of the plurality of processors is booted. The shared value may be stored in a memory used by the first processor and may be incremented by the first processor to produce the revised shared value responsive to booting a second of the plurality of processors. The first processor may communicate the revised shared value to the second processor.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
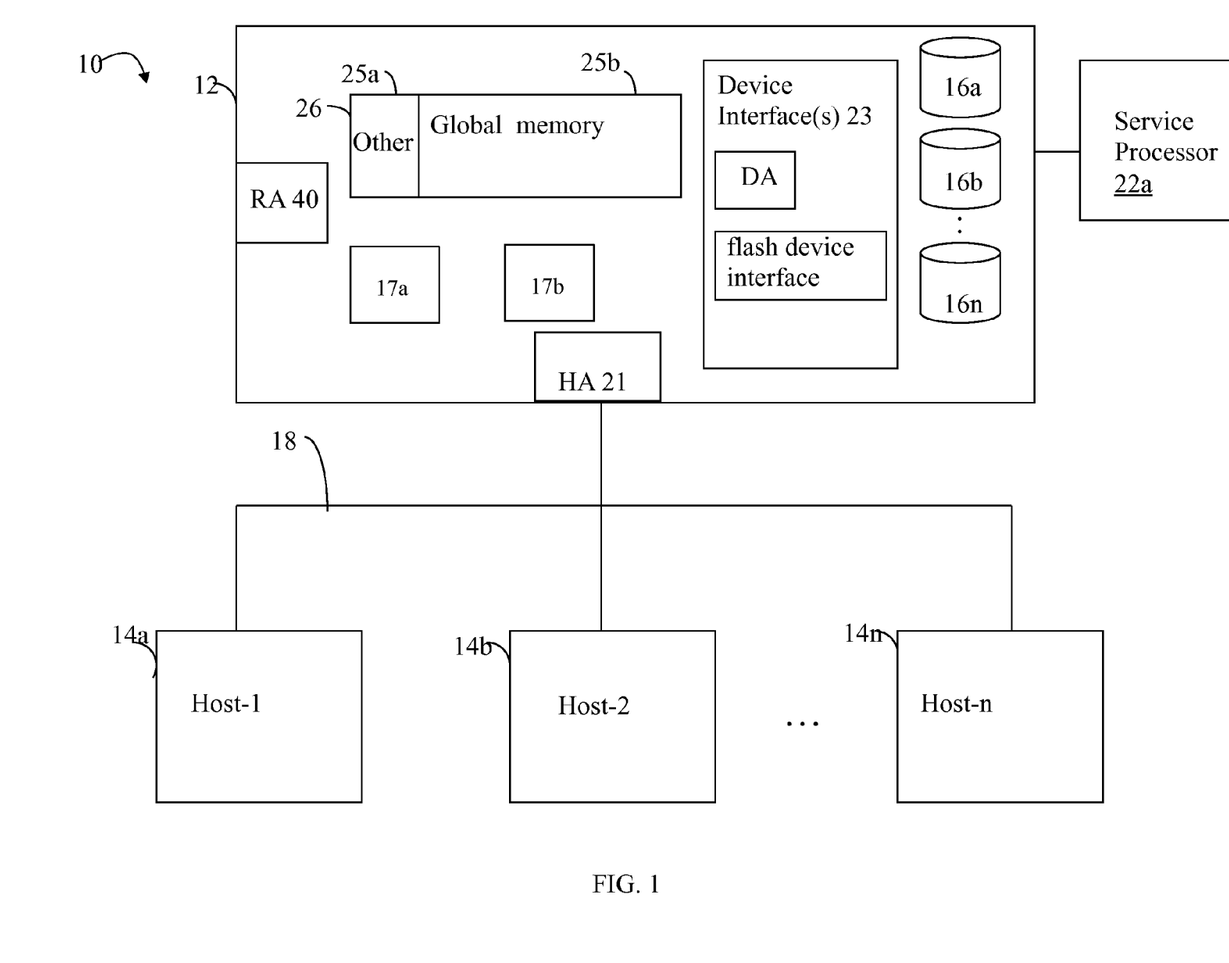
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system may be a single unitary data storage system, such as single data storage array, including two main storage processors or computer processing units (CPUs). Techniques herein may be more generally use in connection with any one or more data storage system each including a different number of main processors than as illustrated herein. The data storage system 12 may be a data storage array, such as a VNX™ data storage array by EMC Corporation of Hopkinton, Mass., including a plurality of data storage devices 13a-13n and two main storage processors or CPUs 17a, 17b. The processors 17a, 17b may be CPUs included in the data storage system for processing requests and commands. In connection with performing techniques herein, an embodiment of the data storage system may include multiple service processors including more than two main CPUs as described. The VNX™ data storage system mentioned above may include two main processors 17a, 17b for performing processing in connection with servicing requests such as, for example, received from hosts or other clients of the data storage system. Additionally, the two storage processors or CPUs 17a, 17b may be used in connection with failover processing such as when communicating with the management system 16.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, volumes, or logical units (LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

What will now be described in the context of a data storage system are techniques that may be used to generate unique identifiers (IDs) that are unique within the storage system. Such techniques may be performed without reliance on persistent data storage or a system clock. For purposes of illustration, following paragraphs utilize the techniques for generating unique IDs in a data storage system having two main CPUs or storage processors (SPs). As such, generation of a unique ID may be performed by either of the two SPs and techniques herein provide for ensuring uniqueness among all such IDs when generated by either SP within the data storage system. In other words, two different IDs generated using techniques herein are guaranteed to be unique independent of which SP generated the IDs.

As a first step, each SP may have a copy of a same arbitrary or random value. For purposes of reference herein, the commonly shared arbitrary or random value used in generating unique IDs may also be referred to as a shared value. The shared value may be stored on each SP such as cached in memory of each SP. Such memory may be, for example, local to each SP. In one embodiment, the shared value may be 64 bit integer although other suitable values having a different size may be utilized. For example, an embodiment may also use an integer that is 16-bits, 32 bits, or another number of bits. The shared value may be, for example, a randomly generated 64 bit integer.

The shared value may be incremented each time any one of the SPs reboots. For example, assume there are two SPs, SP A and SP B. At a first point in time, each of SP A and SP B has a copy of the same first shared value. At a second subsequent point in time, SP A may crash or go offline such that SP B is the surviving SP at the second point in time. At a third point in time, SP A may reboot. As part of SP A's rebooting process, SP A may communicate with SP B thereby signaling to SP B that SP A is rebooting and/or has rebooted. In response to SP B receiving such notification regarding the rebooting of SP A, SP B may increment, or more generally, modify the first shared value to generate a second shared value that is different from the first shared value. SP B may then communicate the second shared value to SP A to use as the new current shared value commonly used by both SP A and SP B. The shared value may be incremented by the surviving SP, such as SP B, each time its peer SP, such as SP A, boots. In this manner, the shared value may have a different value each time any one of the SPs reboots whereby a new revised shared value may be determined using the current shared value maintained in the memory of the surviving or non-booting SP. Thus, as long as one of the SPs is up and running, the shared value may be maintained and valid. In one embodiment in which the shared value is a 64 bit integer, the shared value may be incremented by one (1) each time one of the SPs boots.

The shared value may be a first input or element used in generating a unique ID in accordance with techniques herein. The unique ID may be generated or created by one of the SPs whereby the shared value may be combined with other inputs or elements to generate the unique ID as the resulting output.

Figure 2:
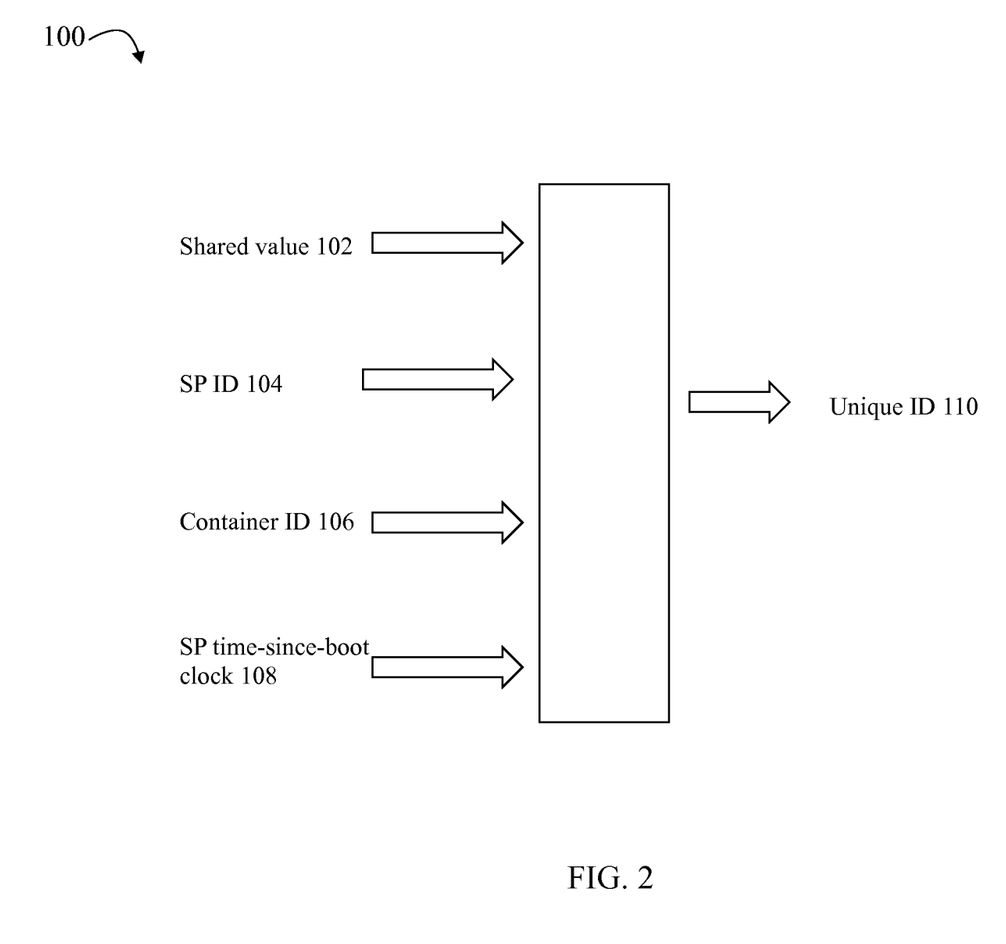
FIG. 2 is an representation illustrating the different inputs that may be used in generating unique identifiers in an embodiment in accordance with techniques herein.

Referring to FIG. 2, shown is an example 100 of inputs that may be combined and used in generating the unique identifier in an embodiment in accordance with techniques herein. The shared value 102 may be combined with other inputs including an identifier of the SP (SP ID) 104 creating or generating the unique ID, an identifier of an allocated resource's container (container ID) 106, and the current value of the creating SP's time-since-boot clock 108. The inputs 102, 104, 106 and 108 may be used to generate the unique ID 110. In one embodiment, the inputs 102, 104, 106 and 108 may be combined, such as by concatenating the inputs, to generate the unique ID 110. For example, the inputs 102, 104, 106 and 108 may be sequentially appended to each other in the foregoing order to generate the unique ID 110. It should be noted that an embodiment may utilize or otherwise combine the foregoing inputs 102, 104, 106 and 108 in other suitable ways to generate the unique ID 110. For example, the inputs 102, 104, 106 and 108 may be concatenated in any order.

The shared value 102 may be as described above. The SP ID 104 may be a globally unique identifier or name, such as a world wide name (WWN) or world wide identifier (WWID) uniquely identifying the SP in the data storage system. The container ID 106 may identify a location or instance of a data structure, or more generally a container, which will incorporate the unique ID 110 being generated. Generally, the unique ID 110 may be utilized in any suitable manner and may denote a memory location, address or identifier associated with this larger structure or container that will include or otherwise utilize the unique ID 110. In one embodiment, the unique ID 110 may be a field or element included in a larger data structure and the container ID 106 may denote the location or address of this larger data structure. For example, the container ID 106 may be an address of the larger structure in memory. In one embodiment, the larger structure incorporating or including the unique ID 110 may be an element in an array in which each element of the array is a different one of the larger structures. In this case, the container ID 106 may be an integer denoting the array index or array element of the particular structure including the unique ID 110. Additional details regarding a particular container that may include the unique ID 110 are described elsewhere herein.

The SP time-since-boot clock 108 may be an absolute amount of time denoting the amount of time that has elapsed since the creating SP was last booted. Each SP may maintain a time value used as 108 which is initialized or set to 0 each time the SP is booted and which is monotonically increasing as the amount of time since last booted subsequently elapses.

In this manner, the shared value 102 may be combined with the creating SP's ID 104, the container ID 106, and the current value of the creating SP's monotonically increasing time-since-boot clock 108 to generate the unique ID 110 having a value that is guaranteed to be unique across both SPs.

The unique ID 110 may be used in any suitable application. In one embodiment, the unique ID 110 may be incorporated into a larger structure as noted above. The larger structure may be a token structure representing a generated token. Tokens have a wide variety of uses. Generally, a token may be generated as a representation or identifier of any entity such as, for example, a data item, depending on the particular usage. An exemplary use of tokens incorporating the unique ID 110 is described in more detail elsewhere herein.

Figure 3:
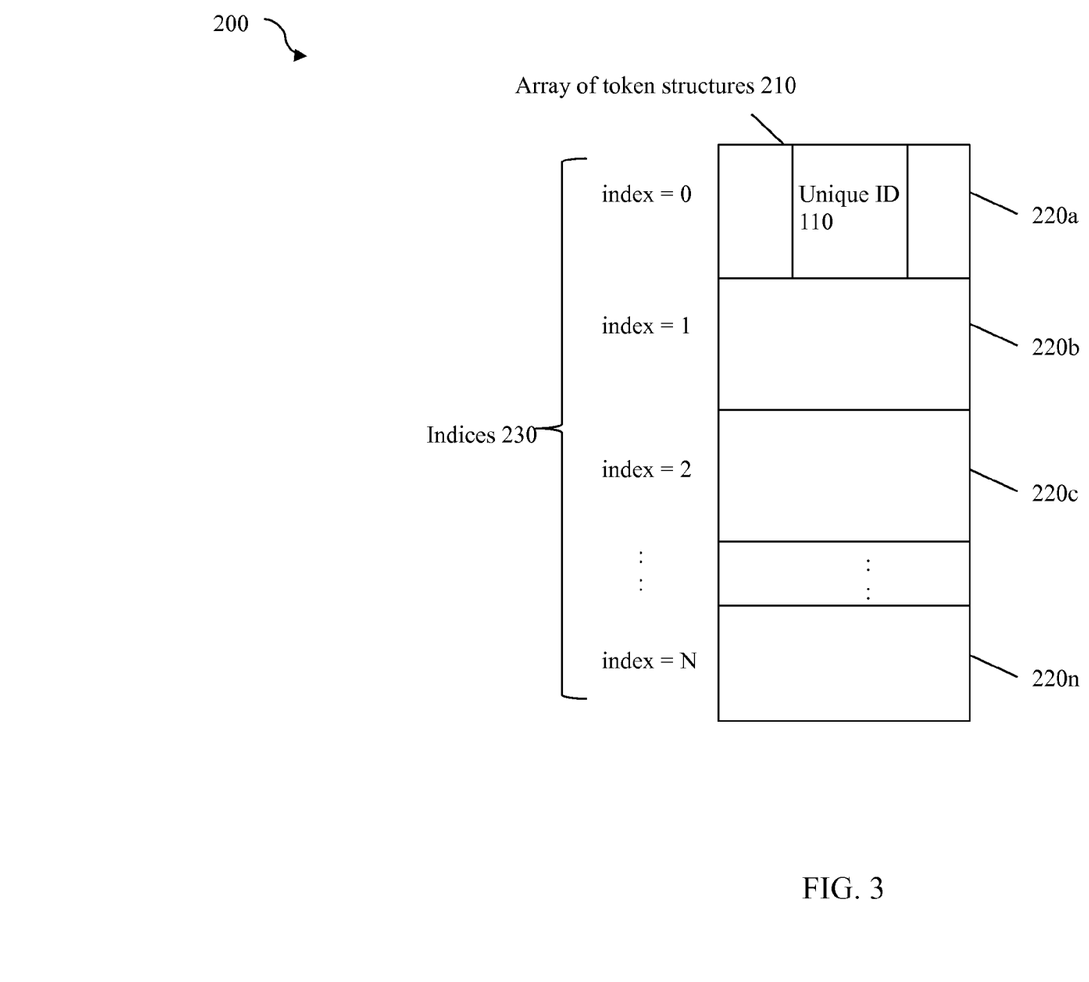
FIG. 3 is an example illustrating an array of tokens whereby each token incorporates a unique identifier generated in accordance with techniques herein.

Referring to FIG. 3, shown is an example 200 of an array of token structures 210 that may be used in an embodiment in accordance with techniques herein. The array 210 may be an array of token structures whereby each array element is a token structure. For reference purposes, let token_array denote the array of token structures 210 and token_array[i], having index "i", denotes a particular element or entry in the array identifying one of the token structures for a particular generated token. In this example, the token_array may have "N+1" elements, N being an integer equal to or greater than 0 and index "i" may be an integer, whereby 0<i<N. In the example 200, index values from 0 to N, inclusively, for each token_array element are illustrated as indices 230 whereby 220a is token_array[0], 220b is token_array[1], 220c is token_array[2], and 220n is token_array[N].

Each of the token structures of elements 220a-220n of the token_array 210 may correspond to an instance of a container or larger structure such as described above in connection with FIG. 2 whereby the container or larger structure may incorporate or include a unique ID 110 therein such as illustrated in 220a. It should be noted that each of the token structures 220a-220n may similarly include a different unique ID 110 generated in accordance with techniques herein although only 220a is so illustrated. With reference back to FIG. 2 in one embodiment using the token_array of token structures as in FIG. 3, processing may be performed to generate the unique ID 110 which is incorporated into one of the token structures of the array 210. The container ID 106 used in generating the unique ID 110 may be the index "i" denoting the particular entry or token structure of the array 210. For example with reference to FIGS. 2 and 3, techniques herein may be used to generate unique ID 110 which is included as a field in token structure 220a identified by index=0 within the array 210. In this case, the container ID 106=0, denoting index=0, may be used in generating the unique ID 110 incorporated into token structure 110.

With reference to FIG. 3 and token structure 220a, it should be noted that the unique ID 110 may be included as a field located anywhere within the token structure 220a. For example, in one embodiment, each token structure 220a-n may be 512 bytes and the unique ID 110 may be included as a portion of the 512 bytes (e.g., the unique ID may be represented as a first number of bits included as a portion of the total bits in the token).

With reference back to FIG. 2, in one embodiment, the size of the unique ID may be 20 bytes comprising 4 bytes for the shared value 102, 4 bytes for the SP ID 104, 4 bytes for the container ID 106 (whereby the container ID may be the token index as just described in connection with FIGS. 3), and 8 bytes for the SP time-since-boot clock 108. The foregoing are exemplary sizes and an embodiment in accordance with techniques herein may more generally use any suitable size fields.

In one embodiment tokens may be generated by a token driver that ensure that no two tokens it generates are identical. The token driver may be code executed by a processor, such as an SP generating the token. Since each token generated includes a different unique ID 110, then each such generated token may also be guaranteed to be unique. Thus, the token driver may generate a token in an embodiment in accordance with techniques herein by incorporating a unique ID 110 into each token. As described above, the driver starts with an arbitrary in-memory value, shared value 102, that is kept in sync between peer SPs. If one SP reboots, this shared value 102 is incremented to reflect that a new "generation" of time-since-boot clock values 108 (of the creating SP) can be used without compromising the goal of uniqueness. The time-since-boot clock 108 of a creating SP is used because it can never be "wound back" or reset to repeat previous values. The foregoing time-since-boot clock 108 is in contrast to the system clock, which may be reset. The identifier of the creating SP, SP ID 106, is also incorporated into the unique ID 110 to ensure that even tokens created at the exact same time on two SPs that booted at the exact same time will be unique. Finally, an index number, or more generally container ID 106, representing the container where the token data is stored on the creating SP may be included in the generated unique ID 110 to guarantee that two tokens created at the exact same time on the same SP will be distinct from each other. It should be noted that techniques described herein may be characterized as impervious to, or unaffected by, system clock changes and resets. Such techniques described herein for unique ID generation by the token driver allow the token driver to generate these unique IDs allowing for a high-performance use case. For example, as described in more detail below, generation of the unique IDs in accordance with techniques herein may be used in connection with performing I/O related requests on the I/O path.

Figure 3B:
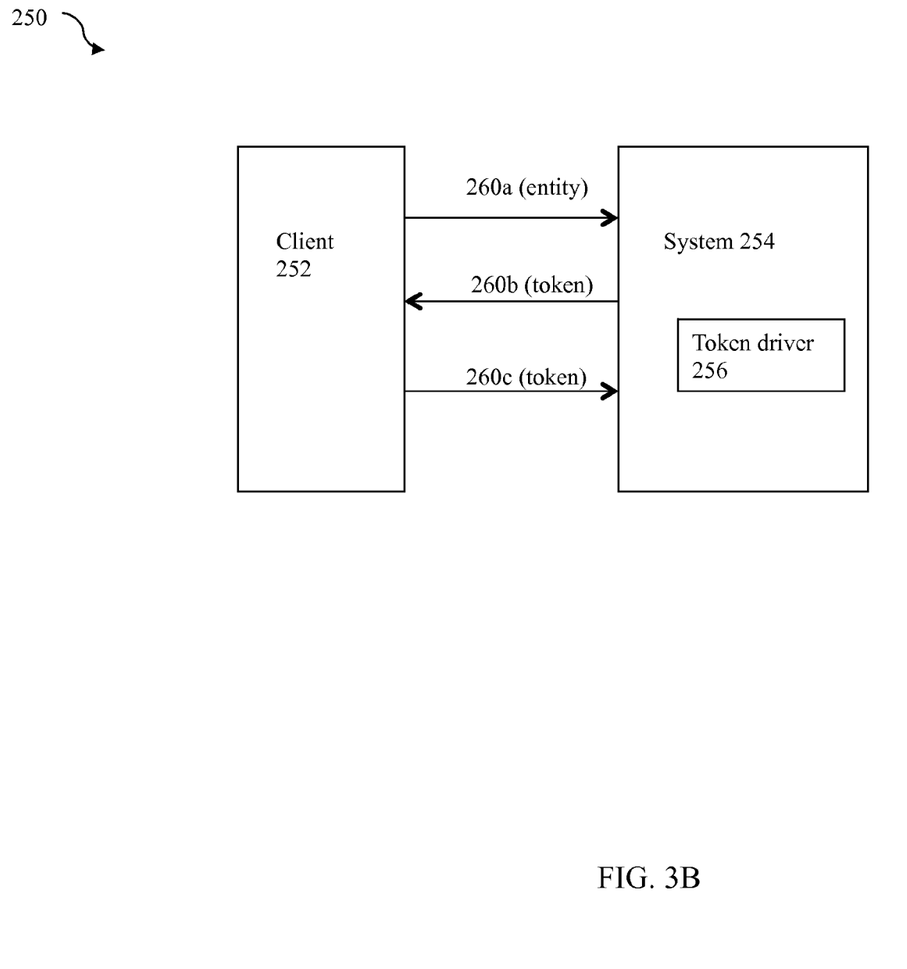
FIGS. 3B and 5 are examples illustrating information and messages that may be exchanged between a client and a system in an embodiment utilizing techniques herein.

In one embodiment with reference to FIG. 3B, a client 252 may issue a first request 260a to a system 254 including the token driver 256 that generates a token representing a particular entity, such as a data item. The particular entity may be included or identified in the first request 260a. In response, the token driver 256 may generate a unique ID 110 as described above and then include or incorporate the unique ID 110 into a generated token representing the particular data item of the first request. The token may be returned 260b to the client 252 and the client 252 may subsequently make other requests, such as to the system 254, using the generated token. For example, the client 252 may make a second request 260c to perform an operation where the request 260c may include the token used to identify the particular entity rather than explicitly specify the particular entity in the request 260c. The system 254 receives the second request 260c including the token and may use the token to identify the particular entity represented by the token. Thus, the system 254 receiving the token may use the token to map to, point to, or otherwise identify the particular entity for which the token had previously been generated. In other words, a system may include a token driver that, for a particular entity, generates a token including the unique ID at a first point in time. At a later point in time, the system may use the token to determine or identify the particular entity uniquely represented by the token. As will be described in more detail below, the system 254 may be a data storage system, the client 252 may be a host, and the second request 260a may be a request to perform a data operation with respect to location of data represented by the token.

Figure 4:
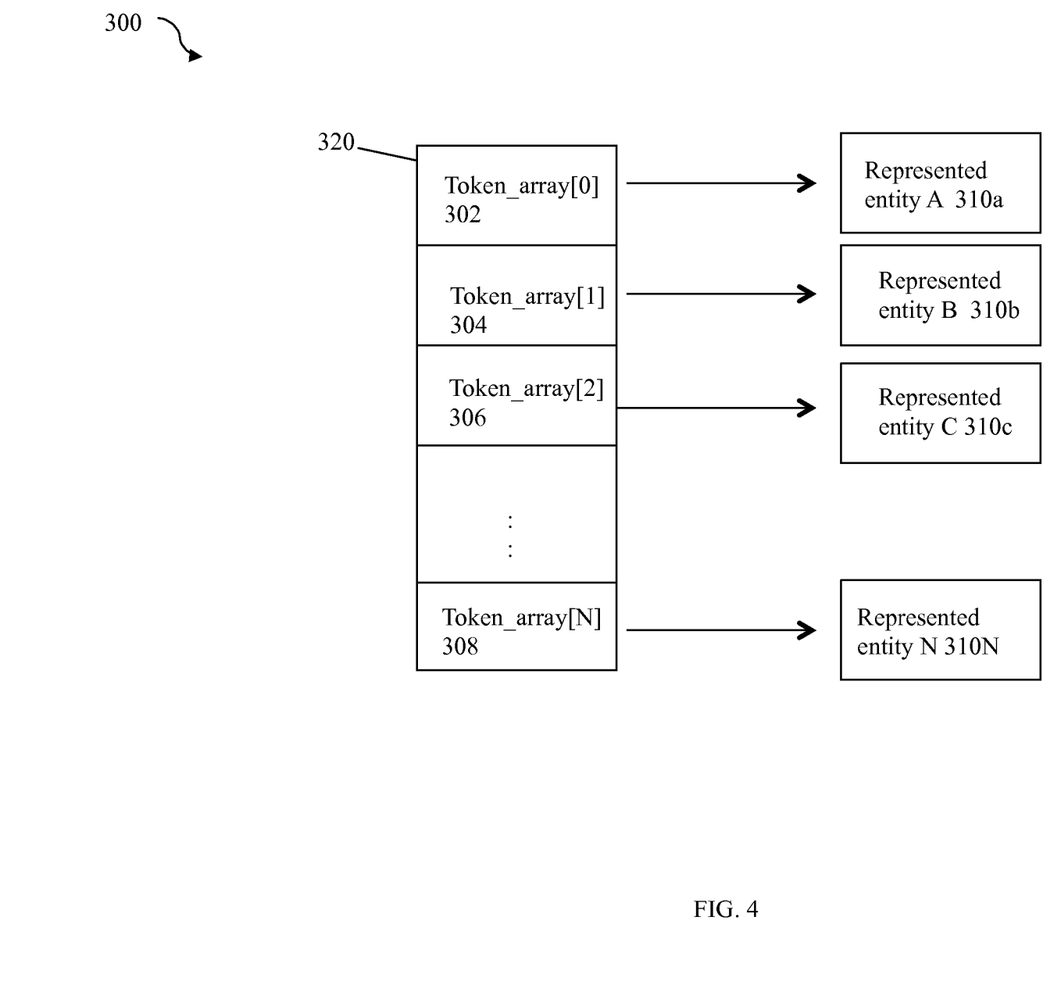
FIG. 4 is an example illustrating mapping of tokens to corresponding entities represented the tokens in an embodiment utilizing techniques herein.

Referring to FIG. 4, shown is an example 300 illustrating tokens mapped to represented entities in an embodiment in accordance with techniques herein. The example 300 includes an array of tokens 320 such as described elsewhere herein. The array 320 may be the token_array as described above having elements token_array[0] 302 through token_array[N] 308. Thus, each of 302, 304, 306, and 308 may be a token structure representing a token which includes a unique ID 110 generated in accordance with techniques herein. The array 320 may be included in system 254 having token generator 256. During operation, the token driver may receive a request to generate a first token 302 for a represented entity A 310a. The token driver may generate the first token 302 including a unique ID in accordance with techniques herein. The system 254 may also store information denoting the represented entity A 310a and may map the corresponding first token 302 to the represented entity A 310a. In this manner, the system 254 is able to uniquely identify the particular entity A represented by the first token 302 at a later point in time when presented with the first token 302.

The token driver may receive another request to generate a second token 304 for a represented entity B 310b. The token driver may generate the second token 304 including a unique ID in accordance with techniques herein. The system 254 may also store information denoting the represented entity B 310b and may map the corresponding second token 304 to the represented entity B 310b. In this manner, the system 254 is able to uniquely identify the particular entity B represented by the second token 304 at a later point in time when presented with the second token 304. In a similar manner, the token driver may generate additional tokens, such as denoted by 306 and 308, and may map each such generated token 306, 308 to the entity 310C, 310N represented by each generated token (or to information describing or denoting the represented entity).

In one embodiment as described in more detail below, the token may represent a source location of an I/O operation request to copy data to a destination or target location. Thus, the represented entity may be the source location(s) of the data. A source location may be specified, for example, by identifying a device (e.g., LUN) and location on the device (e.g., LUN offset range or logical block address range on the LUN). It should be noted that the source location may identify data located on one or more different devices, one or more locations on the same device (whereby such locations may or may not be logically consecutive or sequential), and/or one or more locations on different devices (e.g., different LUNs). The token may not actually include data denoting the source location whereby a client receiving the token may not be able to identify the source location from the token. In this manner, the token may be passed from the system 254 to the client 252 and also possibly to other clients without the need for encypting the token. In other words, the token may be passed between clients whereby each such client may be unable to determine the source location or represented entity from the token. However, the system 254 which generated the token or otherwise has access to information such as illustrated in FIG. 4 may be able to map a previously generated token to the represented source location such as, for example, in connection with servicing a request, such as 260c of FIG. 3B, including such a token.

In connection with a data storage system, one operation that may be performed is to copy data from a source area to a target area whereby both of the foregoing may be included in the same data storage system. Generally, the source area may comprise one or more source ranges each corresponding to a possibly different LBA (logical block address) range of a source device (e.g., LUN). In a similar manner, the target area may comprise one or more target ranges each corresponding to a possibly different LBA range of a target device (e.g., LUN). Each of the source ranges may be on the same or a different source device than other source ranges, and each of the target ranges may be on the same or a different target device than other target ranges. Furthermore, the copy operation may result from an originating request within the data storage system (e.g., data storage system internally generated the copy operation) as well as external from the data storage system (e.g., issued by an external client such as a host). In one embodiment, each source range for a particular source device may be expressed using a starting offset and length whereby starting offset denotes the starting offset of the source range on the particular source device and the length denotes the size or span of the source range. Each source range (expressed using a starting offset and length) and associated source device may be specified as a triple or set of location information including the source device, starting offset and length. In a similar manner, each target range (expressed using a starting offset and length) and associated target device may be specified as a triple or set of location information. In an embodiment in accordance with techniques herein, the size of the data portion identified by each such triple or set of location information may differ. However, the total length or size represented by all triples of the source area may be greater than or equal to the total length of size represented by all triples of the target area.

As an example, consider a request to a copy operation originating from a client, such as a host, that is external with respect to the data storage system whereby the source and target areas of the copy operation are included in the same data storage system.

In this example, the host may want to copy data from a source area to a target area. As noted elsewhere herein, the source area (including the source data to be copied) may include one or more source ranges. Each source range itself may specify a contiguous logical address range of a source device. However, each source range with respect to another source range may not be so contiguously located on the same source device. In a similar manner, the target area may be expressed as one or more target ranges. Each target range itself may specify a contiguous logical address range of a target device. However, each target range with respect to another target range may not be so contiguously located on the same target device. Furthermore, each of the foregoing source and target ranges may possibly be located on different devices (e.g., different LUN) in the data storage system.

What will be described is use of a token-based exchange of commands between the host and the data storage system whereby the source area may be represented using a token. For simplicity, discussion may refer to a single source device including all the source ranges and a single target device including all target ranges. However, each of the source and target ranges may be located on a different device within the data storage system.

Figure 5:
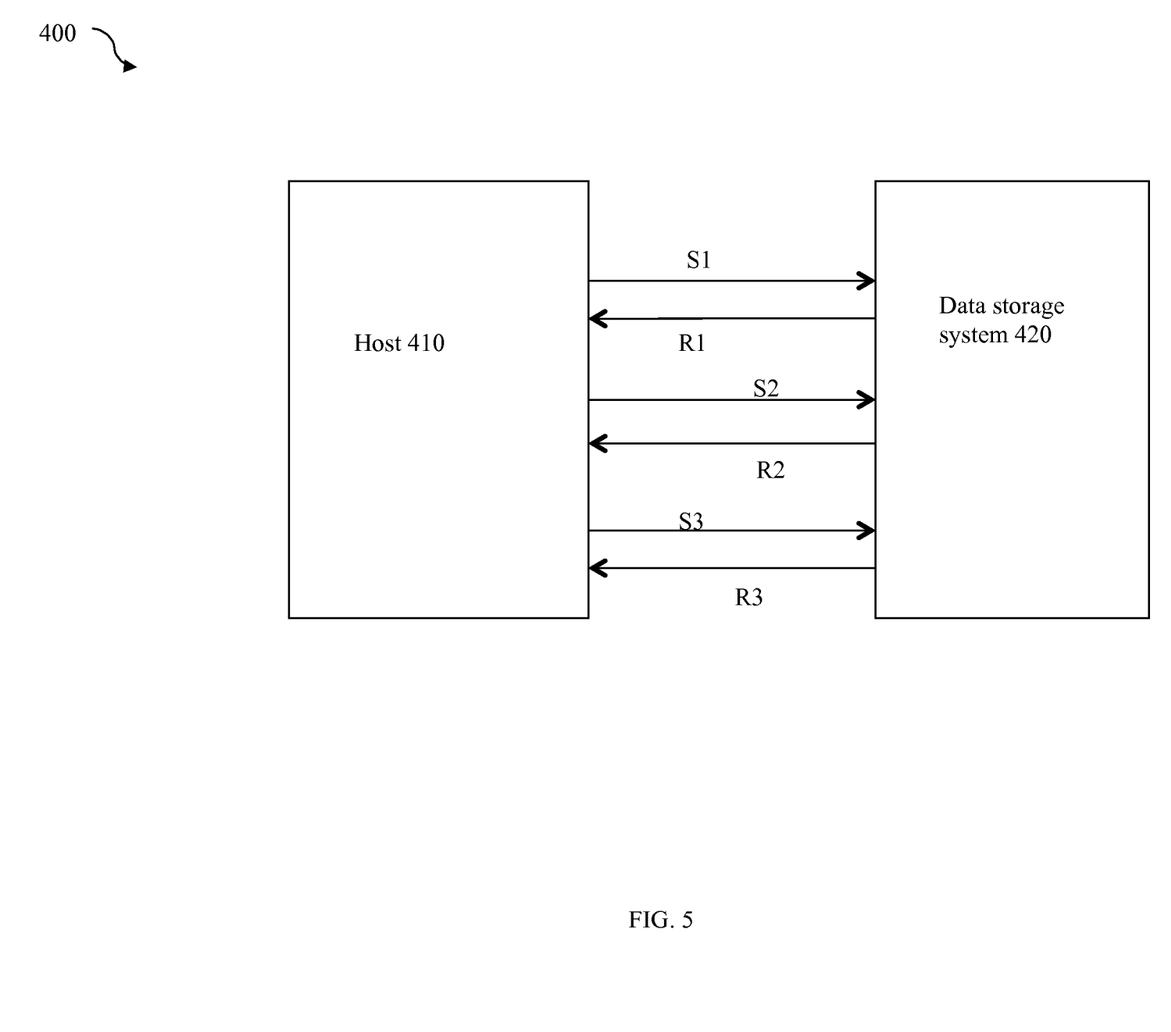

With reference to FIG. 5, shown is an example illustrating exchanges between a host 410 and a data storage system 420 in an embodiment in accordance with techniques herein. In a first step, S1, the host sends the source device of the data storage system a "populate token" (PT) command identifying the source area, from which data is copied, as a set of one or more source ranges (e.g. different possibly non-contiguous LBA ranges) on the source device. The command requests that the data storage system generate a token, also referred to as an opaque token. Generally, the opaque token represents the source area (e.g., representing the set of one or more source ranges on the source device) as well as the particular data contents stored in the source area at a point in time when the opaque token is generated. The opaque token is described in more detail below and elsewhere herein. The one or more source ranges representing the source area may be included as parameters in the PT command along with possibly other parameters depending on the embodiment. The data storage system may send a response or reply R1 indicating receipt of the command S1 and successful generation of the requested token corresponding to the source area. Responsive to receiving the PT command, a token driver, such as represented by element 256 of FIG. 3B, may generate a token representing the source area in accordance with techniques described herein. For example, with reference to FIG. 4, the source area specified in the PT command may identify an entity to be represented using the generated token. The data storage system may store information describing the source area as an element of the illustrated data structure of 300. For example, the source area may be represented by 310a and the generated token representing the source area may be 302.

In a second step S2, the host may send another command request to the data storage system to obtain or retrieve the opaque token generated by the data storage system in S1 for the PT command. In response R2, the opaque token representing the source area may be returned to the host by the data storage system. The host may use the opaque token to request in a third step S3 to copy data from a source area (as represented by the opaque token) to a destination or target area.

In step S3 the host may issue a "write using token" (WUT) command request to a target device of the data storage system whereby the WUT command may specify the source area by including the opaque token in the WUT command. The WUT command request may be generally characterized as the request from the host to perform a data movement or copy operation from a source area to a target area whereby the source area including the data to be copied is denoted by the opaque token. Parameters specified in the WUT command request payload may also identify the target area as one or more target ranges (e.g. different possibly non-contiguous LBA ranges). Additionally, the parameters of the WUT command request may include, for example, a copy location offset, such as in logical blocks. The entire set of source ranges specified as the source area may be collectively viewed as a single logical representation of source data whereby each of the source ranges may be appended or concatenated in the logical representation. The starting location from which data is copied may be determined with respect to such a collective logical representation of appended source ranges whereby the copy location offset represents an offset with respect to the start of the logical representation of the source area or collectively appended source ranges. For example, assuming the offset represents a number of blocks, the starting copy location of the source data to be copied is obtained by adding the block offset relative to the first location in the above-mentioned logical representation of the source ranges. The offset may be an integer that is equal to or greater than zero and does not exceed the size of the logical representation. It should be noted that the host issuing the WUT command request may be the same host or a different host (or more generally different client) than the host which performed steps S1 and S2.

The opaque token is a token representing the source area (e.g., representing the set of one or more source ranges on the source device) as well as the particular data contents stored at the source copy location at a point in time when the opaque token is generated. The opaque token may be generated using any suitable technique. The opaque token may be generally characterized as an identifier formed to uniquely represent the source copy location on the source device at the particular point in time when the token is generated. The token generated may be dependent upon (e.g., may be generated using), for example, the source area (e.g. set of subranges or logical block addresses of the source device) and the date and time information (e.g., date/time stamp) at which the token is generated and/or the actual data contents stored at the source area when the token is generated. Thus, the token may serve to represent a point in time copy of the source data stored at the source area. The technique used to generate the token may allow the data storage system to also, given the token, determine the source area (e.g., the one or more source ranges) and whether the data content stored at the source area has been modified since the token was previously generated.

The token generated by the data storage system responsive to receiving the PT command, which is then returned to a host and included as a parameter representing a source location in the subsequent WUT command, may be generated in accordance with techniques herein. For example, the generated token may be represented as a structure including information such as described in connection with one of 220a-220n of FIG. 3. The token may include a unique ID 110 generated in accordance with techniques described herein, for example, such as illustrated in connection with FIGS. 2 and 3.

When the data storage system receives the opaque token as in connection with the WUT command, the data storage system may perform processing to determine the source area (e.g., set of source ranges) and whether the data of the source area has been modified since the token was previously generated. For example, the data storage system may use structures such as described in connection with the example 300 of FIG. 3B to map a received token (e.g., 302) that was previously generated to its corresponding represented entity (e.g., 310a), the source area. If any data of the source area has been modified since the token was generated, the token may be invalidated since it no longer represents the same point in time copy of the source data at the source area.

In one embodiment using the above-mentioned tokens, all the ranges of the source area denoted by the opaque token may be included in a single source device (e.g., all source ranges of the source area may identify LBA ranges of the same source LUN). The source device may be implicitly specified as the device to which the PT command request is directed in S1. In a similar manner, all the ranges of the target area may be included in a single target device. The target device may be implicitly specified as the device to which the WUT command request is directed in S3. However, as a variation, the same techniques using tokens may be generally directed to a source area including multiple non-contiguous LBA ranges whereby such ranges are not all located on the same source device. Each of the one or more of the source ranges may be located in a different source device. For example, as described elsewhere herein, each of the source ranges may be included in a different source device. In such an embodiment, the PT command request may allow a client to specify a particular source device for each of the source ranges. Accordingly, the opaque token may be generated to also reflect the particular source device associated with each such range. In a similar manner, the techniques using tokens may be generally directed to a target area including multiple non-contiguous LBA ranges whereby such ranges are not all located on the same target device. Each of the target ranges may be included in a different target device. In such an embodiment, the WUT command request may allow a client to specify a different target device for each of the ranges of the target area. Thus, the WUT command request may include parameters whereby for each target range, a target device associated with the target range may be identified.

In one embodiment, the ranges, copy location offset, and the like, may be expressed in terms of atomic units which are blocks. Each block may be, for example 512 bytes. Additionally, the commands described in the exchanges between the host and data storage system may be SCSI commands.

With reference back to FIG. 5, in response to the command S3 issued to the data storage system, the data storage system may return a response R3 denoting, for example, the status of the requested command of S3 (e.g., whether the command was successfully executed by the data storage system).

Use of such a token-based exchange of commands between the host and data storage system provides for an accelerated copying technique for reading and writing data within the data storage system. Without use of the token based mechanism such as described herein, the host may otherwise have to issue a first command to read data from the data storage system whereby the data is returned to the host, and a second command to write the data to the data storage system at the target location. In contrast, the token-based exchange of commands as described herein may be used to accelerate copy operations and optimize data transfer requests initiated from the host without requiring transfer of the data to be copied from the data storage system to the host and then from the host back to the data storage system. With the token-based technique, the data storage system determines the source data included at a source area using the opaque token and the copy location offset specified in the WUT command.

In response to receiving the WUT command request, the data storage system may translate the WUT command request into a copy request. It should be noted that the WUT command request may be generally characterized as one way in which an external data storage system client may initiate a copy request. Additionally, it should be noted that the data movement copy request may be initiated as a data storage system internal request rather than from an external client copy request. The data storage system internal request may be performed, for example, in connection with various operations and tasks performed within the data storage system and its management activities. For example, there may be code executing on the data storage system that initiates and issues a copy request.

The foregoing use of tokens is merely one application utilizing the unique ID generated in accordance with techniques herein. As will be appreciated by those skilled in the art, the unique ID generated in accordance with techniques herein may be generally used in connection with any suitable application and the foregoing is one exemplary use.

Figure 6:
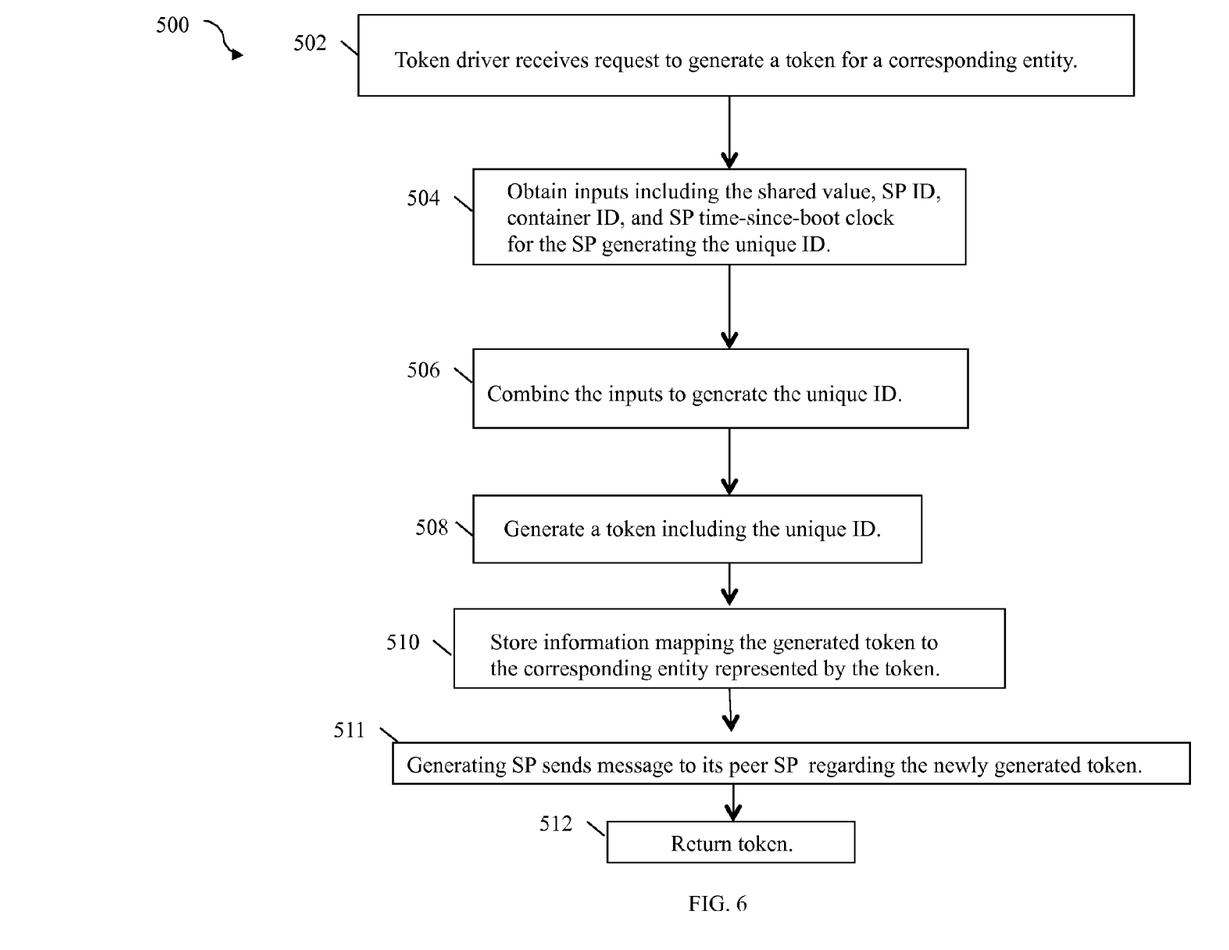
FIG. 6 is a flowchart of processing steps that may be performed in an embodiment in accordance with techniques herein.

Referring to FIG. 6, shown is a flowchart 500 of processing steps that may be performed in an embodiment in accordance with techniques herein. The flowchart 500 summarizes processing described above illustrating the exemplary use of unique ID generation herein with tokens. At step 502, the token driver receives a request to generate a token for a corresponding entity. At step 504, inputs used to generate a unique ID in accordance with techniques herein are obtained. As described in connection with FIG. 2, such inputs may include shared value, SP ID of the creating SP, a container ID, and the creating SP's time-since-boot clock. At step 506, the inputs obtained in step 504 may be combined, or more generally, used in generating the unique ID. In one embodiment, the inputs may be concatenated or appended sequentially to one another to obtain the resulting unique ID. At step 508, token is generated including the unique ID. At step 510, information may be stored, such as on the data storage system, mapping the generated token to the corresponding entity represented by the token. At step 511, in an embodiment including two SP as noted above, the SP generating the token may send a message to its peer SP thereby alerting the peer SP regarding the creation of the newly generated token. The message sent from the creating SP to its peer SP may include the newly generated token. At step 512, the generated token may be returned by the token driver to the requester, such as the host or other client (internal or external within the data storage system), which requested the token.

As described herein, the techniques for unique ID generation may be performed for any application or usage. For example, the steps 504 and 506 may be performed in connection with any application in which unique IDs are utilized.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for generating a unique identifier comprising:
   receiving a shared value, said shared value being a common value used by a plurality of processors;
   receiving a processor identifier of a first of the plurality of processors;
   receiving a container identifier identifying a memory location;
   receiving a time value denoting an amount of time that has elapsed since the first processor was last booted; and
   performing first processing by the first processor to determine the unique identifier using a plurality of values including the shared value, the processor identifier, the container identifier and the time value.

2. The method of claim 1, wherein the shared value is a randomly selected integer.

3. The method of claim 2, wherein the shared value is incremented each time any one of the plurality of processors is booted thereby producing a revised shared value each time any one of the plurality of processors is booted.

4. The method of claim 3, wherein the shared value is stored in a memory of the first processor and is incremented by the first processor to produce the revised shared value responsive to booting a second of the plurality of processors, and wherein the first processor communicates the revised shared value to the second processor.

5. The method of claim 1, wherein the container identifier identifies a memory location of a structure and the method includes storing the unique identifier as a field in the structure.

6. The method of claim 1, wherein the time value represents an absolute amount of time.

7. The method of claim 1, wherein the first processing includes concatenating the plurality of values.

8. The method of claim 1, wherein the processor identifier is a world wide name uniquely identifying the first processor.

9. The method of claim 5, wherein a token driver receives a request to generate a token, said token being the structure including the unique identifier as a field in the structure.

10. The method of claim 9, wherein the token driver is code that is executed by the first processor of a data storage system.

11. The method of claim 5, wherein the container identifier is a first index value identifying an element in an array.

12. The method of claim 11, wherein the array is an array of tokens and each element of said array is a token structure representing a different token, and wherein the first index value identifies a first token structure including the unique identifier.

13. A system comprising:
   a host and a data storage system comprising a plurality of main processors, and wherein the host includes a first memory comprising code stored therein for:
      sending a first request to the data storage system to generate a first token representing a first entity; and
      receiving the first token from the data storage system; and
   wherein the data storage system includes a second memory comprising code stored therein for:
      receiving the first request from the host; and
      performing first processing by a first of the plurality of processors to generate the first token, said first processing including:
         obtaining a shared value, said shared value being a common value used by the plurality of main processors;
         obtaining a processor identifier of the first processor;
         obtaining a container identifier identifying a memory location;
         obtaining a time value denoting an amount of time that has elapsed since the first processor was last booted;
         generating a unique identifier using a plurality of values including the shared value, the processor identifier, the container identifier and the time value; and
         generating the first token using the unique identifier.

14. The system of claim 13, wherein the unique identifier is represented as a number of bits included as a portion of the first token.

15. The system of claim 13, wherein the shared value is a randomly selected integer.

16. The system of claim 13, wherein the shared value is incremented each time any one of the plurality of processors is booted thereby producing a revised shared value each time any one of the plurality of processors is booted.

17. The system of claim 16, wherein the shared value is stored in a memory used by the first processor and is incremented by the first processor to produce the revised shared value responsive to booting a second of the plurality of processors, and wherein the first processor communicates the revised shared value to the second processor.

18. A non-transitory computer readable medium comprising code stored thereon generating a unique identifier the non-transitory computer readable medium comprising code for:
- receiving a shared value, said shared value being a common value used by a plurality of processors;
- receiving a processor identifier of a first of the plurality of processors; receiving a container identifier identifying a memory location;
- receiving a time value denoting an amount of time that has elapsed since the first processor was last booted; and
- performing first processing by the first processor to determine the unique identifier using a plurality of values including the shared value, the processor identifier, the container identifier and the time value.

19. The non-transitory computer readable medium of claim 18, wherein the shared value is incremented each time any one of the plurality of processors is booted thereby producing a revised shared value each time any one of the plurality of processors is booted.

20. The non-transitory computer readable medium of claim 19, wherein the shared value is stored in a memory used by the first processor and is incremented by the first processor to produce the revised shared value responsive to booting a second of the plurality of processors, and wherein the first processor communicates the revised shared value to the second processor.

* * * * *